US011030010B2

(12) United States Patent
Nakano et al.

(10) Patent No.: US 11,030,010 B2
(45) Date of Patent: Jun. 8, 2021

(54) PROCESSING STORAGE MANAGEMENT REQUEST BASED ON CURRENT AND THRESHOLD PROCESSOR LOAD USING REQUEST INFORMATION

(71) Applicant: Hitachi, Ltd., Tokyo (JP)

(72) Inventors: Yuta Nakano, Tokyo (JP); Yasuhiro Nakaaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 204 days.

(21) Appl. No.: 16/117,322

(22) Filed: Aug. 30, 2018

(65) Prior Publication Data
US 2019/0129760 A1 May 2, 2019

(30) Foreign Application Priority Data
Oct. 31, 2017 (JP) .............................. JP2017-210564

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/505* (2013.01); *G06F 9/5027* (2013.01); *G06F 9/5044* (2013.01); *G06F 9/5066* (2013.01); *G06F 9/5083* (2013.01)

(58) Field of Classification Search
None
See application file for complete search history.

(56) References Cited

U.S. PATENT DOCUMENTS

| 9,723,080 B2* | 8/2017 | Shibayama | G06F 11/3419 |
| 2005/0172303 A1* | 8/2005 | Kudo | G06F 9/5055 719/316 |
| 2008/0031496 A1* | 2/2008 | Takagi | G06F 9/505 382/115 |
| 2013/0219404 A1* | 8/2013 | Yang | G06F 9/4881 718/104 |
| 2014/0007131 A1* | 1/2014 | Yamauchi | G06F 9/505 718/104 |
| 2015/0205639 A1 | 7/2015 | Matsumoto et al. | |

(Continued)

FOREIGN PATENT DOCUMENTS

| JP | 2011-18281 A | 1/2011 |
| JP | 2011018281 A * | 1/2011 |

(Continued)

OTHER PUBLICATIONS

Japanese Office Action received in corresponding Japanese Application No. 2017-210564 dated Jul. 2, 2019.

*Primary Examiner* — Abu Zar Ghaffari
(74) *Attorney, Agent, or Firm* — Mattingly & Malur, PC

(57) ABSTRACT

An information processing apparatus includes a computer resource including a processor and a memory, a component to be controlled, a data control module configured to receive a data request and access the component and a management module configured to receive a management request and manage the component. The management module is configured to share the computer resource with the data control module and receive the management request, and dynamically change a processing order of the management request based on a usage status of the computer resource.

2 Claims, 14 Drawing Sheets

(56) References Cited

U.S. PATENT DOCUMENTS

| | | | |
|---|---|---|---|
| 2015/0256475 A1* | 9/2015 | Suman | G06F 9/5027 |
| | | | 709/226 |
| 2015/0309813 A1* | 10/2015 | Patel | G06F 11/3664 |
| | | | 703/22 |
| 2016/0134476 A1* | 5/2016 | Kerber | H04L 67/104 |
| | | | 709/221 |
| 2017/0357530 A1* | 12/2017 | Shih | G06F 9/4887 |
| 2017/0371709 A1* | 12/2017 | Harper | G06F 9/5038 |
| 2018/0336150 A1* | 11/2018 | Jinn | H04W 28/08 |
| 2019/0004869 A1* | 1/2019 | Kim | G06F 3/0679 |
| 2019/0042090 A1* | 2/2019 | Raghunath | G06F 3/0604 |

FOREIGN PATENT DOCUMENTS

| | | |
|---|---|---|
| JP | 2012-147107 A | 8/2012 |
| WO | 2014/167716 A1 | 10/2014 |
| WO | 2016/194171 A1 | 12/2016 |

* cited by examiner

14 REQUEST TABLE

| 141 # | 142 REQUEST ID | 143 REQUEST TYPE | 144 OBJECT TYPE | 145 OBJECT ID | 146 RELATING OBJECT TYPE | 147 RELATING OBJECT ID | 148 WAITING-TO-BE-PROCESSED REQUEST ID | 149 LOAD |
|---|---|---|---|---|---|---|---|---|
| 1 | 1 | Format | Volume | 1 | Pool | 1 | - | 10 |
| 2 | 2 | Format | Volume | 2 | Pool | 1 | - | 15 |
| 3 | 3 | Attach | Volume | 3 | Pool | 2 | - | 20 |
| 4 | 4 | Initialize | Pool | 1 | Volume | 1, 2 | 1, 2 | 10 |

FIG. 2

15 CONFIGURATION INFORMATION TABLE (OBJECT TYPE: Pool)

| # | OBJECT ID | CAPACITY | RELATING OBJECT TYPE | RELATING OBJECT ID |
|---|---|---|---|---|
| 1 | 1 | 500GB | Volume | 1,2 |
| 2 | 2 | 500GB | Volume | 3 |
| 3 | 3 | 1TB | Volume | 4 |

*FIG. 3*

15 CONFIGURATION INFORMATION TABLE (OBJECT TYPE: Volume)

| # | OBJECT ID | CAPACITY | ... |
|---|---|---|---|
| 1 | 1 | 200GB | ... |
| 2 | 2 | 300GB | ... |
| 3 | 3 | 500GB | ... |
| 4 | 4 | 1TB | ... |

*FIG. 4*

16 LOAD TABLE

| # | REQUEST TYPE | OBJECT TYPE | CAPACITY | LOAD |
|---|---|---|---|---|
| 1 | Format | Volume | LESS THAN 500 GB | 5 |
| 2 | Format | Volume | 500 GB OR MORE | 15 |
| 3 | Initialize | Pool | LESS THAN 10 TB | 10 |
| 4 | Initialize | Pool | 10 TB OR MORE | 20 |

14 REQUEST TABLE (FIRST PROCESSING)

| # | REQUEST ID | REQUEST TYPE | OBJECT TYPE | OBJECT ID | RELATING OBJECT TYPE | RELATING OBJECT ID | WAITING-TO-BE-PROCESSED REQUEST ID | LOAD |
|---|---|---|---|---|---|---|---|---|
| 141 | 142 | 143 | 144 | 145 | 146 | 147 | 148 | 149 |
| 1 | 1 | Format | Volume | 1 | Pool | 1 | - | 10 |
| 2 | 2 | Format | Volume | 2 | Pool | 1 | - | 15 |
| 3 | 3 | Attach | Volume | 3 | Pool | 2 | - | 20 |
| 4 | 4 | Initialize | Pool | | Volume | 1, 2 | 1, 2 | 10 |

REQUEST 2 HAVING MAXIMUM VALUE FOR LOAD WITHIN ALLOWABLE LOAD IS PROCESSED

"1, 2" IS SET FOR WAITING-TO-BE-PROCESSED REQUEST ID, AND HENCE THIS RECORD IS NOT PROCESSED

14 REQUEST TABLE (AFTER FIRST PROCESSING)

| 141 | 142 | 143 | 144 | 145 | 146 | 147 | 148 | 149 |
|---|---|---|---|---|---|---|---|---|
| # | REQUEST ID | REQUEST TYPE | OBJECT TYPE | OBJECT ID | RELATING OBJECT TYPE | RELATING OBJECT ID | WAITING-TO-BE-PROCESSED REQUEST ID | LOAD |
| 1 | 1 | Format | Volume | 1 | Pool | 1 | - | 10 |
| 3 | 3 | Attach | Volume | 3 | Pool | 2 | - | 20 |
| 4 | 4 | Initialize | Pool | 1 | Volume | 1, 2 | 1 | 10 |

PROCESSED REQUEST ID (2) IS DELETED FROM WAITING-TO-BE-PROCESSED REQUEST IDs

FIG. 11

14 REQUEST TABLE (SECOND PROCESSING)

| # | REQUEST ID | REQUEST TYPE | OBJECT TYPE | OBJECT ID | RELATING OBJECT TYPE | RELATING OBJECT ID | WAITING-TO-BE-PROCESSED REQUEST ID | LOAD |
|---|---|---|---|---|---|---|---|---|
| 1 | 1 | Format | Volume | 1 | Pool | 1 | - | 10 |
| 3 | 3 | Attach | Volume | 3 | Pool | 2 | - | 20 |
| 4 | 4 | Initialize | Pool | 1 | Volume | 1, 2 | 1 | 10 |

141, 142, 143, 144, 145, 146, 147, 148, 149

REQUEST 1 HAVING MAXIMUM VALUE FOR LOAD WITHIN ALLOWABLE LOAD IS PROCESSED

"1" IS SET FOR WAITING-TO-BE-PROCESSED REQUEST ID, AND HENCE THIS RECORD IS NOT PROCESSED

14 REQUEST TABLE (AFTER SECOND PROCESSING)

| # | REQUEST ID | REQUEST TYPE | OBJECT TYPE | OBJECT ID | RELATING OBJECT TYPE | RELATING OBJECT ID | WAITING-TO-BE-PROCESSED REQUEST ID | LOAD |
|---|---|---|---|---|---|---|---|---|
| 141 | 142 | 143 | 144 | 145 | 146 | 147 | 148 | 149 |
| 3 | 3 | Attach | Volume | 3 | Pool | 2 | - | 20 |
| 4 | 4 | Initialize | Pool | 1 | Volume | 1, 2 | - | 10 |

PROCESSED REQUEST ID (1) IS DELETED FROM WAITING-TO-BE-PROCESSED REQUEST IDs

FIG. 14

14 REQUEST TABLE (THIRD PROCESSING)

| # | REQUEST ID | REQUEST TYPE | OBJECT TYPE | OBJECT ID | RELATING OBJECT TYPE | RELATING OBJECT ID | WAITING-TO-BE-PROCESSED REQUEST ID | LOAD |
|---|---|---|---|---|---|---|---|---|
| | 141 | 142 | 143 | 144 | 145 | 146 | 147 | 148 | 149 |
| 3 | 3 | Attach | Volume | 3 | Pool | 2 | - | 20 |
| 4 | 4 | Initialize | Pool | 1 | Volume | 1, 2 | - | 10 |

WAITING-TO-BE-PROCESSED REQUEST ID HAS NO VALUE, AND HENCE THIS RECORD CAN BE PROCESSED

REQUEST 4 HAVING MAXIMUM VALUE FOR LOAD WITHIN ALLOWABLE LOAD IS PROCESSED

FIG. 15

14 REQUEST TABLE (AFTER THIRD PROCESSING)

| # | REQUEST ID | REQUEST TYPE | OBJECT TYPE | OBJECT ID | RELATING OBJECT TYPE | RELATING OBJECT ID | WAITING-TO-BE-PROCESSED REQUEST ID | LOAD |
|---|---|---|---|---|---|---|---|---|
| 141 | 142 | 143 | 144 | 145 | 146 | 147 | 148 | 149 |
| 3 | 3 | Attach | Volume | 3 | Pool | 2 | - | 20 |

FINAL PROCESSING ORDER IS "2→1→4→(3)". REQUEST 3 IS PROCESSED WHEN ALLOWABLE LOAD BECOMES LARGE ENOUGH

PROCESSING STORAGE MANAGEMENT REQUEST BASED ON CURRENT AND THRESHOLD PROCESSOR LOAD USING REQUEST INFORMATION

CLAIM OF PRIORITY

The present application claims priority from Japanese patent application JP 2017-210564 filed on Oct. 31, 2017, the content of which is hereby incorporated by reference into this application.

BACKGROUND

This invention relates to an information processing apparatus including a management function.

In recent years, there is a demand to manage IT resources (information processing apparatuses including a storage apparatus and a server apparatus) even when there is no management server due to cost reduction and other such reasons. For this reason, IT resources that can be managed even under an environment without a management server are being developed. Such an IT resource incorporates a management program hitherto installed on a management server, and the IT resource itself and the management program share calculation resources (including a CPU and a memory). Therefore, the management program is required to efficiently process a request with a limited amount of resources.

As a technology for performing control through use of a limited amount of resources, there is known JP 2012-147107 A. In JP 2012-147107 A, there is disclosed a technology for changing a data transfer order depending on the load on a network in a computer system configured to transfer data from a plurality of data transfer apparatus to a data reception apparatus.

SUMMARY

When the above-mentioned related art is applied to a storage apparatus serving as an IT resource, the management program and a control program of the storage apparatus share computer resources. In the storage apparatus, a request (e.g., configuration change request) for managing the storage apparatus and a request (e.g., I/O request) for using the storage apparatus are received, and the management program and the control program process the respective requests.

With the processing load of the I/O request being heavy, it is not possible to process a request for processing imposing a heavy load among requests for management. In this case, it is possible to process a request for management imposing a light load. However, components of an IT resource have a dependence relationship, and hence when a processing order is changed in consideration of only a calculation resource required for processing a request for each of the components, the request sometimes fails.

Therefore, this invention has been made in view of the above-mentioned problem, and has an object to flexibly control the order of processing requests for management based on a dependence relationship among components.

A representative aspect of the present disclosure is as follows. An information processing apparatus, comprising: a computer resource including a processor and a memory; a component to be controlled; a data control module configured to receive a data request and access the component; and a management module configured to receive a management request and manage the component, wherein the management module is configured to: share the computer resource with the data control module; and receive the management request, and dynamically change a processing order of the management request based on a usage status of the computer resource.

Therefore, according to one embodiment of this invention, when a plurality of management requests are issued to a component of an information processing apparatus, it is possible to flexibly control the order of processing the plurality of management requests based on a dependence relationship among components without adversely affecting the execution of the data control module.

BRIEF DESCRIPTION OF THE DRAWINGS

FIG. 2 is a table for showing an example of the request table according to the embodiment of this invention.

FIG. 3 is a table for showing an example of the configuration information table relates to the object type being the pool according to the embodiment of this invention.

FIG. 4 is a table for showing an example of the configuration information table relates to the object type being the pool volume according to the embodiment of this invention.

FIG. 5 is a table for showing an example of the load table according to the embodiment of this invention.

FIG. 10 is a table for showing an example of the request table exhibited in the first processing according to the embodiment of this invention.

FIG. 11 is a table for showing an example of the request table exhibited after the first processing is completed according to the embodiment of this invention.

FIG. 12 is a table for showing an example of the request table exhibited in the second processing according to the embodiment of this invention.

FIG. 13 is a table for showing an example of the request table exhibited after the second processing is completed according to the embodiment of this invention.

FIG. 14 is a table for showing an example of the request table exhibited in the third processing according to the embodiment of this invention.

FIG. 15 is a table for showing an example of the request table exhibited after the third processing is completed according to the embodiment of this invention.

DETAILED DESCRIPTION OF THE PREFERRED EMBODIMENTS

An embodiment of the present invention is now described referring to the accompanying drawings.

Figure 1:
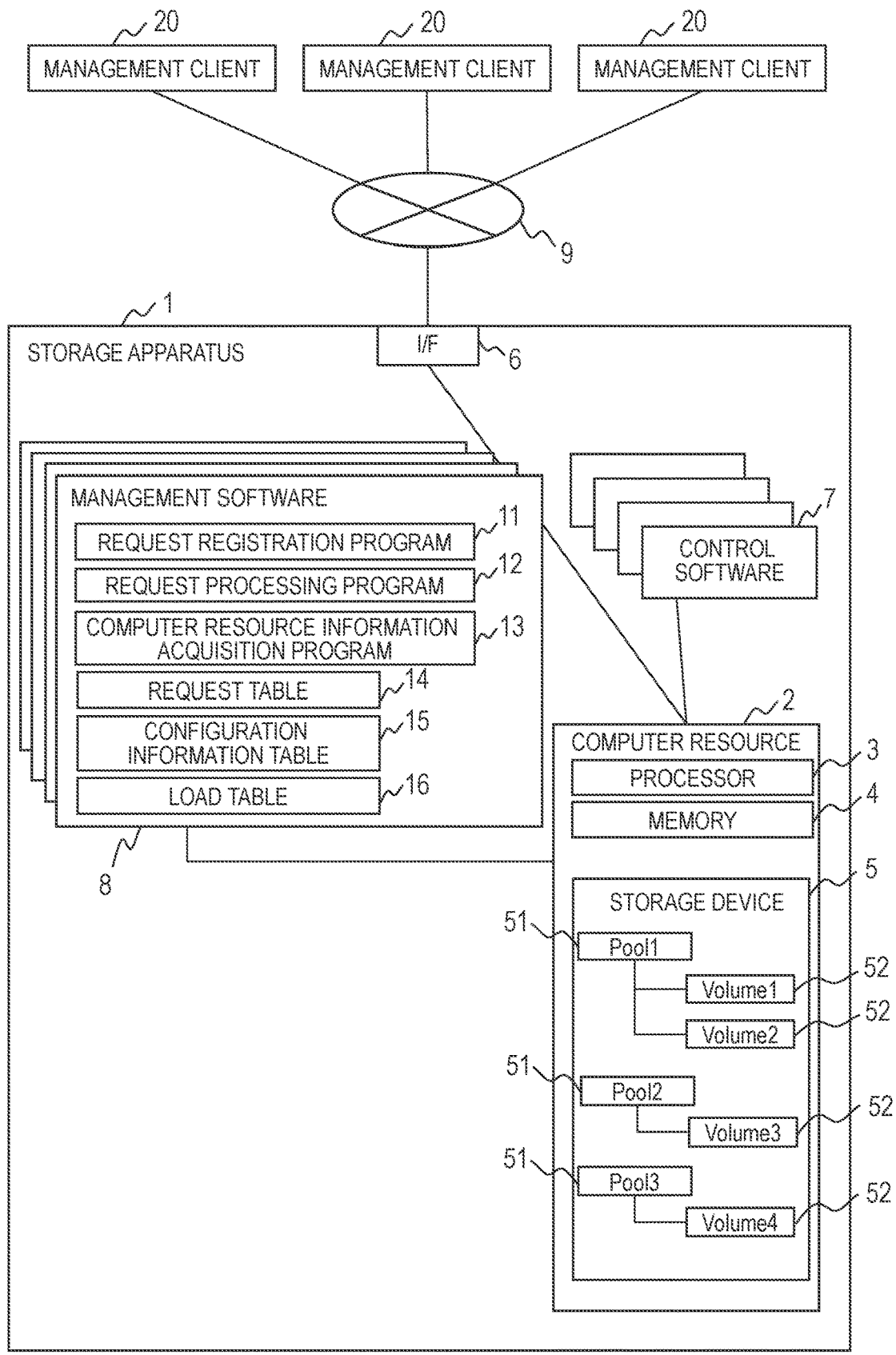
FIG. 1 is a block diagram for illustrating an example of a storage apparatus according to an embodiment of this invention.

FIG. 1 is a block diagram for illustrating an example of a storage apparatus according to an embodiment of this invention. A storage apparatus 1 is an example of an IT resource (or information processing apparatus) to which this invention is applied. The storage apparatus 1 configures a pool 51 in a storage area of a storage device 5 based on a management request (hereinafter referred to simply as "request") received from at least one management client 20, allocates a volume 52 to the pool 51, and provides the volume 52 to the management client 20 or a client (not shown).

The storage apparatus 1 includes a computer resource 2, which includes a processor 3, a memory 4, and the storage device 5, and an interface configured to perform communications to/from the at least one management client 20 via a network 9.

Management software 8 configured to manage the storage device 5 and control software 7 configured to control I/O (read/write) processing for the storage device 5 are loaded into the memory 4 to be executed by the processor 3. The management software 8 and the control software 7 share the computer resource 2. The storage device 5 includes a plurality of drives (or storage mediums), and provides a RAID group or other such storage area.

The management software (management module) 8 manages a component (storage device 5) to be controlled, for example, allocates a storage area of the storage device 5 to the pool 51, allocates a storage area of the pool 51 to the volume 52, and performs mapping between a storage area and a port (not shown), based on the request received from the management client 20. The management software 8 is also capable of, for example, generating and changing a RAID group for providing a storage area.

When receiving a data request (read request or write request) from a client (not shown), the control software 7 (data control module) accesses the storage device 5 being the component to be controlled to return a response to the client. The control software 7 includes a storage control program and a table for control, and a known technology may be applied thereto. Therefore, a detailed description of the control software 7 is omitted in this embodiment.

The management software 8 includes a request registration program 11 for receiving a request from the management client 20, a request processing program 12 for controlling the processing of the registered request, a computer resource information acquisition program 13 for acquiring a load on the computer resource 2, and tables to be used by the respective programs.

The processor 3 performs processing based on the program for each functional module to operate as a functional module configured to provide a predetermined function. For example, the processor 3 performs processing based on the request registration program 11 to function as a request registration module, or performs processing based on the request processing program 12 to function as a request processing module. The same applies to another program. In addition, the processor 3 also operates as a functional module configured to provide respective functions of a plurality of kinds of processing to be executed by the respective programs. A computer and a computer system are provided as an apparatus and a system that include those functional modules. The management software 8 including the request registration program 11 and the request processing program 12 may also function as a management module.

The tables to be used by the respective programs include a request table 14 for registering a received request, a configuration information table 15, in which a dependence relationship (or relevance) among the components of the computer resource 2 is set in advance, and a load table 16, in which a load (estimated value of the load) to be imposed on the computer resource 2 by a request is set in advance.

FIG. 2 is a table for showing an example of the request table 14. The request table 14 is a table generated by the request registration program 11 and updated by the request processing program 12.

The request table 14 includes a number 141, a request ID 142, a request type 143, an object type 144, an object ID 145, a relating object type 146, a relating object ID 147, a waiting-to-be-processed request ID 148, and a load 149 in one record.

The number 141 is a number assigned by the request registration program 11, and is, for example, a serial value. The request ID 142 is an identifier assigned by the request registration program 11, and a value unique within the storage apparatus 1 is configured therefor.

The request type 143 stores a kind of an operation for a component (storage device 5) to be controlled, and includes, for example, a command within a request issued by the management client 20. In the example of FIG. 2, "Format", "Attach", "Initialize", and other such kinds of operations for a storage area are stored.

The object type 144 stores a kind (or name) of a component to be operated. For example, "Volume" and "Pool" each being a component to be operated, which is included in the request issued by the management client 20, are stored in the object type 144.

The object ID 145 stores an identifier for identifying a component to be operated among components having the kind of the component designated by the object type 144. The object ID 145 stores, for example, an object ID acquired from the configuration information table 15 by the request registration program 11 and an identifier of a component to be operated, which is included in the request issued by the management client 20.

The relating object type 146 stores a kind (or name) of a component relating to the object type 144 of the component to be operated. The relating object type 146 stores a value acquired from the configuration information table 15 by the request registration program 11. For example, when the object type 144 is "Volume", "Pool" being a source from which the relevant volume is to be cut out is stored.

The relating object ID 147 stores an identifier for identifying a relating component among components having the kind of the component designated by the relating object type 146. The relating object ID 147 stores a relating object ID acquired from the configuration information table 15 by the request registration program 11.

The waiting-to-be-processed request ID 148 stores the request ID 142 required to be processed prior to the request of the relevant entry based on the relationship between the object type 144 and the relating object type 146. The waiting-to-be-processed request ID 148 is configured or updated by the request registration program 11 or the request processing program 12, respectively, and is allowed to store a plurality of request IDs 142.

The load 149 stores a load estimated to be imposed on the computer resource 2 by the request of the relevant entry. A value set in advance in the load table 16 is configured for the load 149 by the request registration program 11.

FIG. 3 and FIG. 4 are tables for showing examples of the configuration information table 15. The configuration information table 15 is set in advance for each object type. The configuration information table 15 for the object type of "Pool" is shown in FIG. 3, and the configuration information table 15 for the object type of "Volume" is shown in FIG. 4.

The configuration information table 15 is configured by an administrator of the storage apparatus 1 or the management software 8.

The configuration information table 15 for the object type of "Pool" shown in FIG. 3 includes a number 151, an object ID 152, a capacity 153, a relating object type 154, and a relating object ID 155 in one record.

The number 151 is a serial value assigned by the management software 8. The object ID 152 is an identifier assigned by the management software 8 or the administrator of the storage apparatus 1, and a value unique within the storage apparatus 1 is configured therefor.

The capacity 153 stores a capacity of the pool 51. The relating object type 154 stores a kind (or name) of a component relating to (having a dependence relationship with) the relevant pool 51. In the example of FIG. 3, the configuration information table 15 relates to the object type being the pool 51, and hence "Volume" is configured for the relating object type 154.

The relating object ID 155 stores an identifier of a component relating to the relevant pool 51 among components having the kind of the component designated by the relating object type 154. The relating object ID 147 stores a relating object ID acquired from the configuration information table 15 by the request registration program 11. In the example of FIG. 3, the configuration information table 15 relates to the object type being the pool 51, and hence an identifier of the volume 52 allocated to the relevant pool 51 is configured for the relating object ID 155.

The configuration information table 15 for the object type of "Volume" shown in FIG. 4 includes the number 151, the object ID 152, and the capacity 153 in one record. The respective items (fields) are the same as those shown in FIG. 3. When the object type is "Volume", there is no component under the command of the volume 52, and hence no relating object exists.

In this embodiment, the storage apparatus 1 is taken as an example of the IT resource. Therefore, the storage device 5 is used as the component to be controlled by the management software 8, and the capacity and other such items are configured in the configuration information table 15. However, any items suitable for the characteristics and functions of a component of an IT resource may be configured.

FIG. 5 is a table for showing an example of the load table 16. The load table 16 has the load (estimated value of the load) on the computer resource 2 set in advance by, for example, the administrator based on the details of a received request.

The load table 16 includes a number 161, a request type 162, an object type 163, a capacity 164, and a load 165 in one record.

The number 161 is a serial value assigned by the management software 8. The request type 162 stores a kind of an operation for a component (storage device 5) to be controlled, and includes, for example, a command within a request issued by the management client 20.

The object type 163 stores a kind (or name) of a component to be operated. For example, "Volume" and "Pool" are each stored in the object type 163 as a component to be operated, which is included in the request issued by the management client 20.

The capacity 164 stores a threshold value of the capacity of a component. When the component is a storage area, even the same component differs in load imposed on the computer resource 2 depending on the capacity of the component to be operated, and hence the capacity 164 stores the threshold value of the capacity for switching the load in a stepwise manner.

The load 165 stores an increment value of the load (or estimated value of the load) imposed on the computer resource 2 when a request including the relevant request type 162 is processed with the capacity 164 having the object type 163. The value of the load 165 indicates the load imposed on the computer resource 2 shared by the management software 8 and the control software 7. For example, a usage ratio of the processor 3 or a usage ratio of the memory 4 can be used as the load. This embodiment is described by taking a case of using the usage ratio of the processor 3 of the computer resource 2 as the load.

In the example of FIG. 5, for a record including "Format" as the request type 162 and "Volume" as the object type 163, the load 165 is configured to "5" when the capacity 164 is less than 500 gigabytes, and the load 165 is configured to "15" when the capacity 164 is 500 gigabytes or more.

Figure 6:
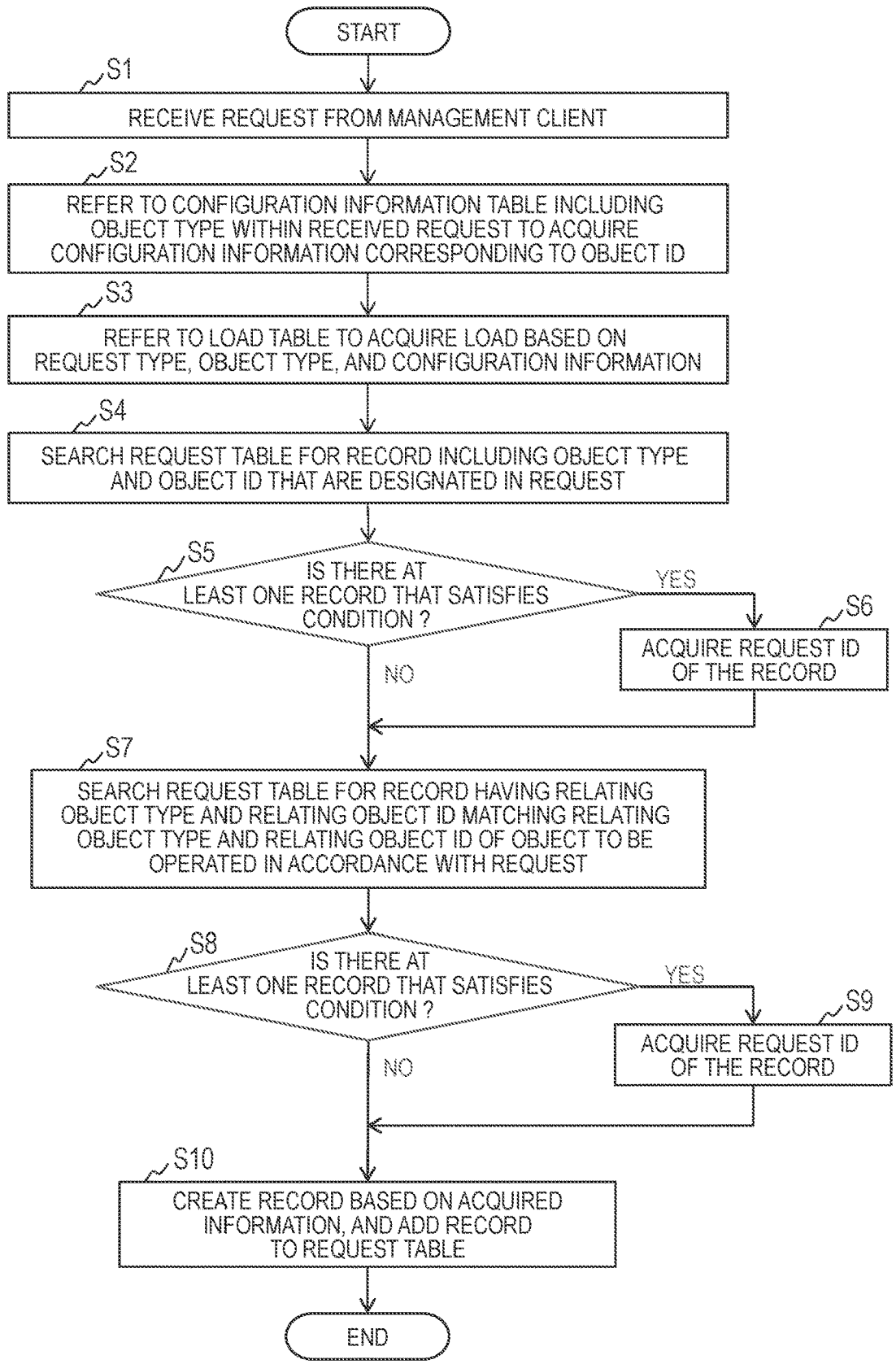
FIG. 6 is a flow chart for illustrating an example of processing for receiving a request according to the embodiment of this invention.

FIG. 6 is a flow chart for illustrating an example of processing for receiving a request, which is to be performed by the request registration program 11 of the management software 8. This processing is executed when the interface 6 receives a request for managing the storage device 5 from the management client 20. The following description is given by taking an example of using the program as the subject of processing, but the processor 3 or the storage apparatus 1 may be used as the subject of processing.

In Step S1, the request registration program 11 receives a request from the management client 20. The request can include the kind (request type) of an operation, the component (object type) to be controlled, and its object ID.

Subsequently, in Step S2, the request registration program 11 acquires the object type and the object ID from within the received request, and refers to the configuration information table 15 for the relevant object type to acquire the configuration information corresponding to the object ID. In this case, the request registration program 11 acquires the capacity 153, the relating object type 154, and the relating object ID 155 as the configuration information.

In Step S3, the request registration program 11 refers to the load table 16 through use of the acquired configuration information (capacity 153), the request type 143, and the object type 144 to acquire the load 165. In this manner, the load 165 suitable for the kind of the operation and the configuration information on the component to be controlled is determined.

In Step S4, the request registration program 11 searches the request table 14 for a record including the object type 144 and the object ID 145 designated by the received request. In other words, the request registration program 11 performs a search as to the presence or absence of a request for the component having the same requested details.

In Step S5, the request registration program 11 determines whether or not the above-mentioned condition is satisfied. When there is no record satisfying the above-mentioned condition, the request registration program 11 advances to Step S7, and when there is a record for the same component, the request registration program 11 advances to Step S6 to acquire the request ID 142 of the relevant record as the waiting-to-be-processed request ID 148. In other words, when there is a request for the same component, the request registration program 11 configures the request for the same component as a request to be processed prior to the relevant request for the waiting-to-be-processed request ID 148 in Step S10 described later.

In Step S7, the request registration program 11 searches the request table 14 for a record including the relating object type 146 and the relating object ID 147 matching with those of the component included in the request.

In Step S8, the request registration program 11 determines whether or not the above-mentioned condition is satisfied. When there is no record satisfying the above-mentioned condition, the request registration program 11 advances to Step S10, and when there is a record exhibiting a match with the same relating object type 146 and the same relating object ID 147, the request registration program 11 advances to Step S9 to acquire the request ID 142 of the relevant record as a waiting-to-be-processed request ID. In other words, when there is a request to be processed prior to a component including a dependence relationship with the component of the relevant request, the request registration program 11 stores the request ID of such a request in the waiting-to-be-processed request ID 148 in Step S10 described later.

In Step S10, the request registration program 11 adds the request, the configuration information, and the waiting-to-be-processed request ID acquired above to a new record.

With the above-mentioned processing, the request registration program 11 of the management software 8 configures the relating object type, the relating object ID, and the load that are related to the component within the received request, and further acquires the request ID of a request including the object ID relating to the relevant component to be controlled as the waiting-to-be-processed request ID 148 to add a new record to the request table 14.

Figure 7:
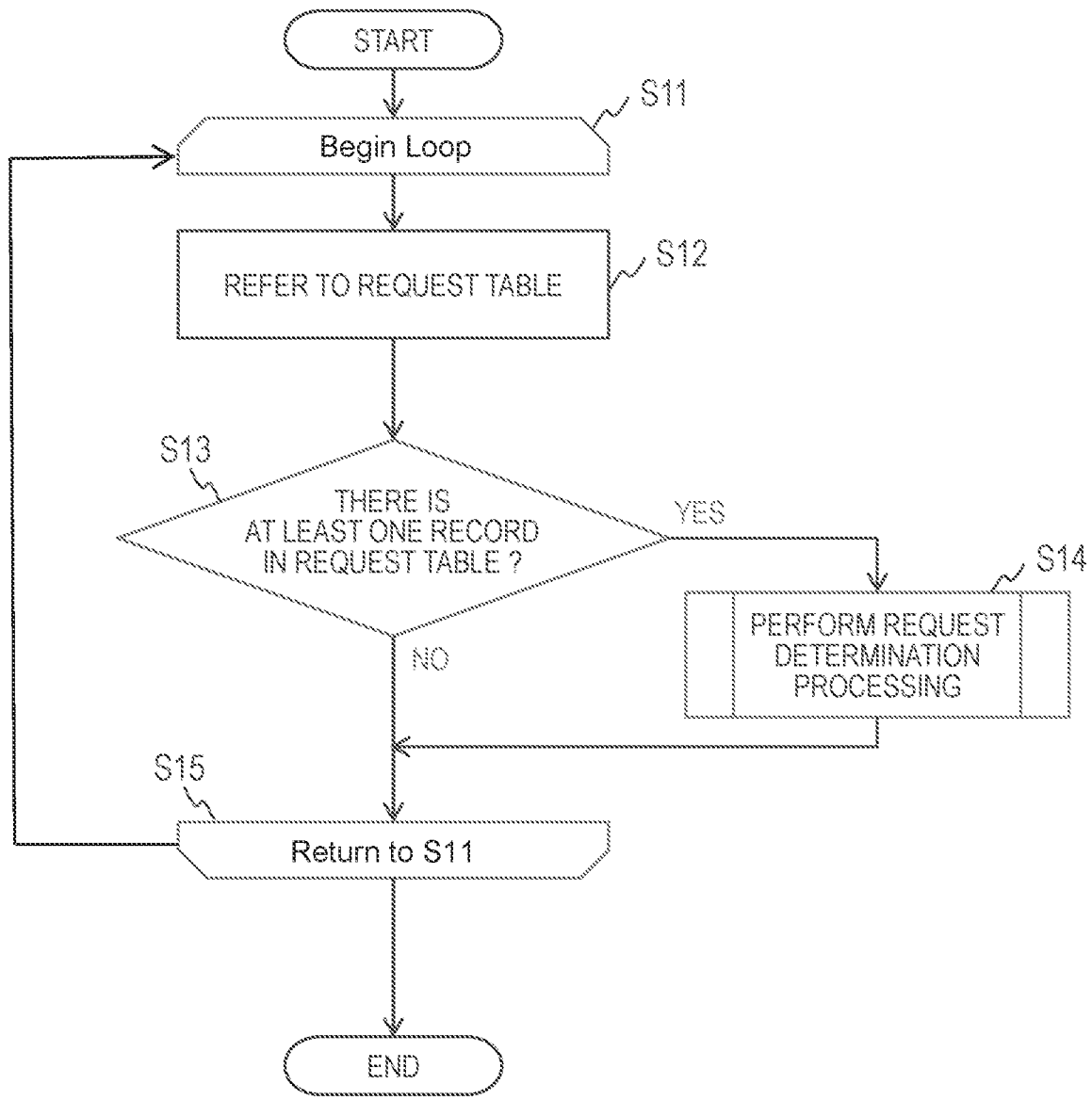
FIG. 7 is a flow chart for illustrating an example of request processing to be performed by the request processing program of the management software according to the embodiment of this invention.

FIG. 7 is a flow chart for illustrating an example of request processing to be performed by the request processing program 12 of the management software 8. In this processing, Step S11 to Step S15 are repeatedly executed.

In Step S12, the request processing program 12 refers to the request table 14. Then, in Step S13, the request processing program 12 determines whether or not the request table 14 has data on at least one record.

When there is data on at least one record, the request processing program 12 advances to Step S14 to execute request determination processing described later. Meanwhile, when there is no data in the request table 14, the request processing program 12 repeatedly executes the processing of Step S12 described later and the subsequent steps.

Figure 8:
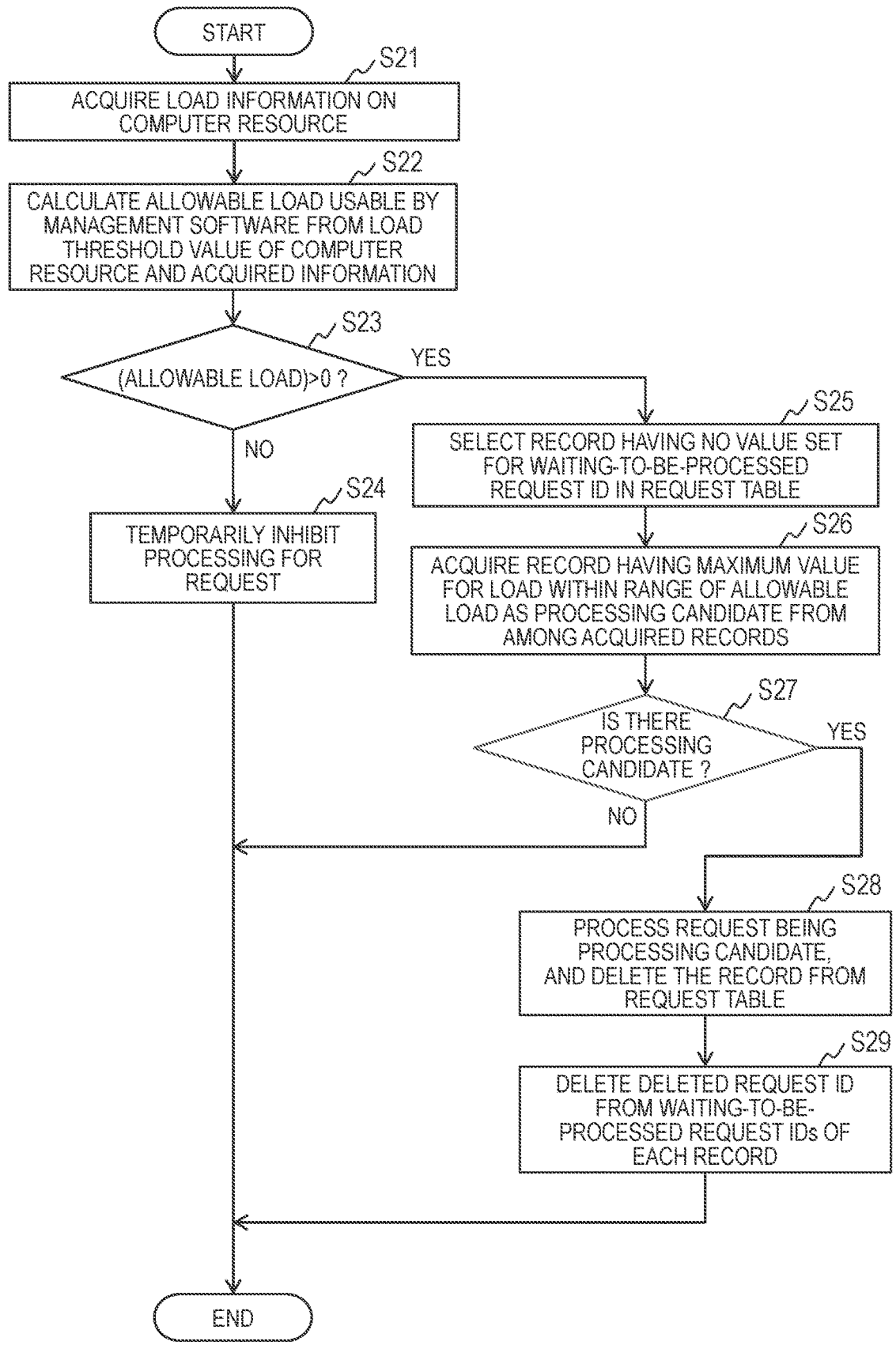
FIG. 8 is a flow chart for illustrating an example of the request determination processing to be performed by the request processing program of the management software according to the embodiment of this invention.

FIG. 8 is a flow chart for illustrating an example of the request determination processing to be performed by the request processing program 12 of the management software 8. This processing is processing to be performed in Step S14 of FIG. 7.

In Step S21, the request processing program 12 calls the computer resource information acquisition program 13, and controls the computer resource information acquisition program 13 to acquire the load information (value relating to a usage status) on the computer resource 2. The computer resource information acquisition program 13 acquires, for example, the usage ratio of the processor 3 as the load information in the above-mentioned manner from an OS (not shown) or a hypervisor (not shown).

In Step S22, the request processing program 12 uses the load information acquired from the computer resource information acquisition program 13 and a load threshold value (first threshold value) of the computer resource 2 set in advance to calculate the allowable load usable by the management software 8 as follows.

(allowable load)=(load threshold value)−(load information)

Figure 9:
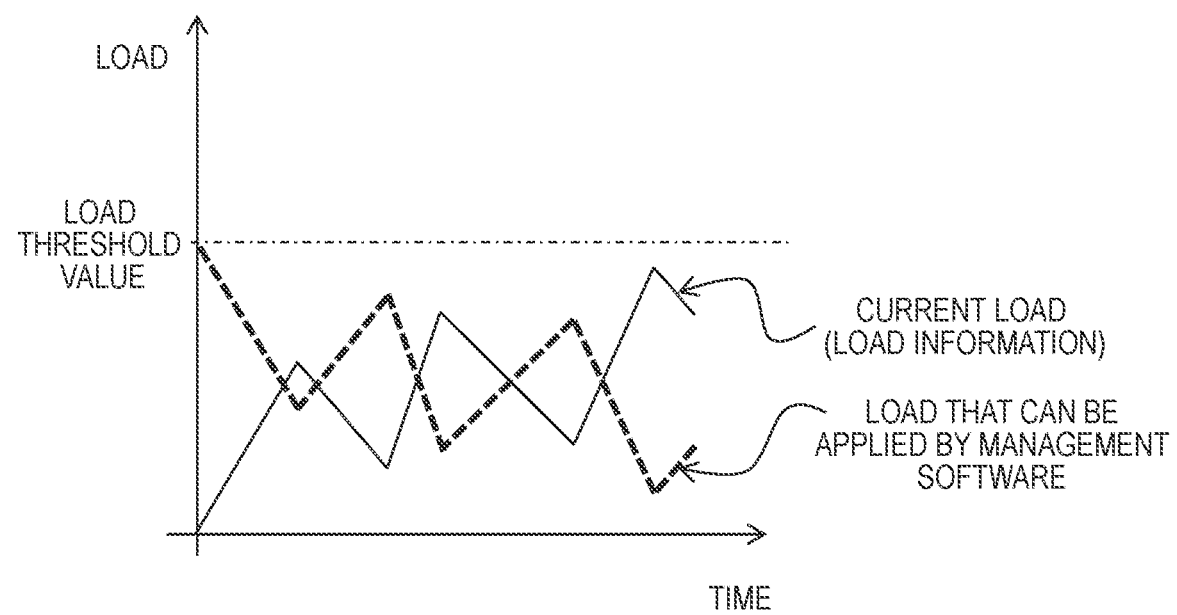
FIG. 9 is a graph for illustrating an example of the relationship between load and time according to the embodiment of this invention.

As shown in FIG. 9, the allowable load fluctuates depending on the computer resource 2 used by the control software 7, and is calculated by subtracting the load used by the control software 7 from the load threshold value.

In Step S23, the request processing program 12 determines whether or not the allowable load is larger than zero. In other words, the request processing program 12 determines the presence or absence of the computer resource 2 usable by the management software 8. When the allowable load is larger than zero (second threshold value), the request processing program 12 advances to Step S25. When the allowable load is zero, the request processing program 12 advances to Step S24.

In Step S24, there is no computer resource 2 usable by the management software 8, and hence the request processing program 12 temporarily inhibits processing of the request waiting in the request table 14, and brings the processing to an end.

Meanwhile, in Step S25, there is a computer resource 2 usable by the management software 8, and hence the request processing program 12 selects a record including no value configure for the waiting-to-be-processed request ID 148. In other words, the request processing program 12 restricts the changing of the order of processing requests depending on, for example, the dependence relationship among components, and maintains the order of processing requests based on the dependence relationship among components even when there is a request that can be processed with a load within a range of the allowable load. This can prevent a failure in processing a request depending on the dependence relationship among components.

In Step S26, the request processing program 12 acquires, from among the records selected above, a record including the load 149 equal to or lighter than the allowable load and including the heaviest load among the records selected above as a processing candidate.

In Step S27, the request processing program 12 determines as a result of the processing of Step S26 whether or not there is a record to be a processing candidate. When there is a processing candidate, the request processing program 12 advances to Step S28. When there is no processing candidate, the request processing program 12 brings the processing to an end.

Subsequently, in Step S28, the request processing program 12 processes the request being the processing candidate, and deletes the record of the relevant request from the request table 14. Then, in Step S29, the request processing program 12 detects a record including a request ID of the relevant request as the waiting-to-be-processed request ID 148, and deletes the relevant request ID from the waiting-to-be-processed request ID 148.

With the above-mentioned processing, the requests stored in the request table 14 are processed in order from the request including the heaviest load 149 within a range of the allowable load, which is a difference between the load threshold value and the load information (current load), when the allowable load has a value larger than zero ((predetermined value)=(second threshold value)). This enables the flexible control of the order of processing requests for managing the component to be controlled.

Then, the management software 8 restricts the changing of the order of processing requests depending on the dependence relationship among components, to thereby maintain the order of processing the requests based on the dependence relationship among components, to thereby be able to prevent a failure in processing a request based on the dependence relationship among components.

In addition, when the allowable load has a value equal to or smaller than a predetermined value, the management software 8 can inhibit the processing of a request to prioritize the processing of a data request to be performed by the control software 7.

FIG. 10 to FIG. 15 are tables for showing changes of the request table 14 exhibited when the above-mentioned is performed. The following description is given of an example of repeating the processing of FIG. 8 three times from the state of FIG. 10 assuming that the allowable load is "15".

FIG. 10 is a table for showing an example of the request table 14 exhibited in the first processing. The request table 14 stores records including the request IDs 142 of "1" to "4", and the request processing program 12 selects a record including no value in the waiting-to-be-processed request ID 148 (Step S25). As a result, the request processing program 12 selects three records including the request IDs 142 of "1" to "3". With this processing, a processing order that depends on the dependence relationship among components is maintained, and the changing of the order of processing requests so as to become inconsistent with the dependence relationship among components is inhibited even when the request can be processed with a load within a range of the allowable load.

Subsequently, the request processing program 12 acquires a record including the load 149 equal to or lighter than the allowable load (=15) and including the heaviest load among the records selected above as the processing candidate (Step S26). With this processing, a record including the load 149 of "15" and the request ID 142 of "2" is selected as the processing candidate, and the request for "Format" is processed with respect to the component of "Volume".

FIG. 11 is a table for showing an example of the request table 14 exhibited after the first processing is completed. When the processing of the request including the request ID 142 of "2" is completed, the request processing program 12 deletes the record including the request ID 142 of "2" (Step S28).

Subsequently, the request processing program 12 retrieves a record including the request ID 142 of "2" of the deleted record as the waiting-to-be-processed request ID 148, and deletes the request ID 142 of "2" of the deleted record from the waiting-to-be-processed request ID 148 (Step S29).

In other words, in FIG. 10, "1" and "2" are configured for the waiting-to-be-processed request ID 148 corresponding to the request ID 142 of "4". The processing of the request including the request ID 142 of "2" has been completed, and hence the request processing program 12 deletes the request ID of "2" from the waiting-to-be-processed request ID 148 while leaving "1".

FIG. 12 is a table for showing an example of the request table 14 exhibited in the second processing. In FIG. 12, the requests including the request IDs 142 of "1", "3", and "4" are in an unprocessed state with the allowable load being "15".

The request processing program 12 selects a record including no value in the waiting-to-be-processed request ID 148 (Step S25). As a result, the request processing program 12 selects two records including the request IDs 142 of "1" and "3".

Subsequently, the request processing program 12 selects a record including the load 149 of "10" and the request ID 142 of "1" as the processing candidate as the record including the load 149 equal to or lighter than the allowable load (=15) and including the heaviest load among the records selected above. Then, the request processing program 12 processes the request for "Format" with respect to the component of "Volume" (Step S26).

FIG. 13 is a table for showing an example of the request table 14 exhibited after the second processing is completed. When the processing of the request including the request ID 142 of "1" is completed, the request processing program 12 deletes the record including the request ID 142 of "1" (Step S28).

Subsequently, the request processing program 12 retrieves a record including the request ID 142 of "1" of the deleted record as the waiting-to-be-processed request ID 148, and deletes the request ID 142 of "1" of the deleted record from the waiting-to-be-processed request ID 148 (Step S29).

In other words, in FIG. 12, "1" is configured for the waiting-to-be-processed request ID 148 corresponding to the request ID 142 of "4". The processing of the request including the request ID 142 of "1" has been completed, and hence the request processing program 12 deletes the request ID of "1" from the waiting-to-be-processed request ID 148, which causes the waiting-to-be-processed request ID 148 to become blank.

FIG. 14 is a table for showing an example of the request table 14 exhibited in the third processing. In FIG. 12, the requests including the request IDs 142 of "3" and "4" are in an unprocessed state with the allowable load being "15".

The request processing program 12 selects a record having no value in the waiting-to-be-processed request ID 148 (Step S25). As a result, the request processing program 12 selects two records including the request IDs 142 of "3" and "4".

Subsequently, the request processing program 12 selects a record including the load 149 of "10" and the request ID 142 of "4" as the processing candidate as the record including the load 149 equal to or lighter than the allowable load (=15) and including the heaviest load among the records selected above. Then, the request processing program 12 processes the request for "Initialize" with respect to the component of "Pool" (Step S26).

FIG. 15 is a table for showing an example of the request table 14 exhibited after the third processing is completed. When the processing of the request including the request ID 142 of "4" is completed, the request processing program 12 deletes the record including the request ID 142 of "4" (Step S28).

Subsequently, the request processing program 12 brings the processing to an end due to the absence of a value within the allowable load in the waiting-to-be-processed request ID 148.

As described above, in this embodiment, the requests are processed in the order of the request IDs 142 of "2", "1", and "4", and the order of processing requests is changed based on a relationship between the load 149 and the allowable load to start the processing from the request including the request ID 142 of "2". However, in order to maintain the order of processing the requests based on the dependence relationship among components, the processing of the request including the request ID 142 of "4" is restricted until the processing of the requests including the request IDs 142 of "1" and "2" has been completed. In other words, the dynamic changing of the processing order based on the allowable load is restricted by the waiting-to-be-processed request ID 148.

In this manner, the information processing apparatus according to this embodiment, in the storage apparatus 1 in which the control software 7 (data control module) for processing a data request and the management software 8 (management module) for processing a management request share the computer resource 2, the order of processing requests based on the dependence relationship among components is maintained while the order of processing requests is dynamically changed depending on the allowable load. With this configuration, it is possible to flexibly control the order of processing requests for management while preventing a failure in processing a request for management.

Further, the management software 8 refers to the configuration information table 15 to detect the dependence relationship among components, and determines the order of processing requests based on the detected dependence relationship among components to store the resultant in the waiting-to-be-processed request ID 148. With this configuration, it is possible to achieve both the dynamic changing of the order of processing requests and the maintaining of the processing order based on the dependence relationship among components.

This embodiment has been described by taking the storage apparatus 1 as an example of the IT resource to which this invention is applied, but this invention is not limited thereto. For example, this invention can be applied to a virtual computer system for operating a management program for managing a virtual machine and a hypervisor, a network system for operating a management program for managing a software defined network (SDN) and control software for a network device, and other such information processing apparatus.

Further, the above-mentioned embodiment has been described by taking an example of controlling the management software 8 to configure the waiting-to-be-processed request ID 148, but the management client 20 may be configured to add a processing order to a management request to be issued thereby. In this case, the management client 20 may store a management request to be processed prior to the relevant request in metadata of a management request.

Further, the above-mentioned embodiment has been described by taking an example of using the load on the computer resource 2 as the information relating to the usage status of the computer resource 2, but the information relating to the usage status can be selected based on the characteristics of a component. For example, a bandwidth between a component and a port or a transfer rate of a component can be used as the information relating to the usage status of the computer resource 2.

Further, the above-mentioned embodiment has been described by taking an example of dynamically changing the processing order of a management request when the allowable load exceeds zero (second threshold value), but the predetermined value of the allowable load is not limited to zero. As long as the allowable load exceeds the predetermined value, a management request is allowed to be processed based on the allowable load. When the allowable load has a value equal to or smaller than the predetermined value, the management request may be inhibited from being processed.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. An information processing apparatus, comprising:
a computer resource including a processor and a memory;
a storage device coupled to the processor,
wherein the memory stores a first table indicating information of a plurality of requests, the information of each request including:
a request identification (ID), a request type, an object type, an object ID, a related object type indicating another object having a predetermined relationship with the object type, a related objected ID indicating another object ID having a predetermined relationship with the object ID, information indicating one or more other request IDs required to be processed prior to the request ID, and load information indicating a load on the processor for processing the request ID,
wherein the memory stores instructions that when executed by the processor, configures the processor to:
receive a request to be processed to manage the storage device, and store information of the request in the first table, the information of the request including the request identification (ID), object type, object ID, related object type, related objected ID, information indicating one or more other request IDs required to be processed prior to the request ID, and load information of the request,
determine the information indicating one or more other request IDs for each of the requests in the first table based on a predefined dependence relationship among the respective object types of the requests in the first table,
determine an unused load capacity of the processor based on a current load of the processor and a predetermined threshold load of the processor, and
process each of the requests in the first table having load information less than the unused load capacity of the processor in descending order of the load information except for a respective request having the information indicating one or more other request IDs required to be processed prior to the respective corresponding request ID,
wherein the object type indicates a storage pool or a storage volume and the related object type indicates a storage pool or a storage volume, and
wherein the processor is configured to process each of the requests in the first table upon determining the unused load capacity of the processor is greater than a first threshold value, which is different than the predetermined threshold load of the processor.

2. A component management method of managing, by a computer resource including a processor and a memory, a component to be controlled, the component management method comprising:
   storing a first table indicating information of a plurality of requests, the information of each request including:
   a request identification (ID), a request type, an object type, an object ID, a related object type indicating another object having a predetermined relationship with the object type, a related objected ID indicating another object ID having a predetermined relationship with the object ID, information indicating one or more other request IDs required to be processed prior to the request ID, and load information indicating a load on the processor for processing the request ID;
   receiving, by the processor, the management request and storing information of the request in the first table, the information of the request including the request identification (ID), object type, object ID, related object type, related objected ID, information indicating one or more other request IDs required to be processed prior to the request ID, and load information of the received request;
   determining the information indicating one or more other request IDs for each of the requests in the first table based on a predefined dependence relationship among the respective object types of the requests in the first table;
   determining an unused load capacity of the processor based on a current load of the processor and a predetermined threshold load of the processor; and
   processing each of the requests in the first table having load information less than the unused load capacity of the processor in descending order of the load information except for a respective request having the information indicating one or more other request IDs required to be processed prior to the respective corresponding request ID,
   wherein the object type indicates a storage pool or a storage volume and the related object type indicates a storage pool or a storage volume, and
   wherein the each of the requests in the first table are processed upon determining the unused load capacity of the processor is greater than a predetermined first threshold, which is different than the predetermined threshold load of the processor.

* * * * *